(12) United States Patent
Adams et al.

(10) Patent No.: US 8,136,037 B2
(45) Date of Patent: Mar. 13, 2012

(54) ASSISTANT FOR MANUALLY PROOFREADING TEXT DOCUMENTS

(75) Inventors: Beth Marie Adams, Raleigh, NC (US); Sheena Lewis, Raleigh, NC (US); Kenya Freeman Oduor, Morrisville, NC (US); Philippa Mignon Rhodes, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 12/173,127

(22) Filed: Jul. 15, 2008

(65) Prior Publication Data

US 2010/0017707 A1    Jan. 21, 2010

(51) Int. Cl.
   *G06F 17/00* (2006.01)
(52) U.S. Cl. ............... 715/256; 434/178; 434/177
(58) Field of Classification Search .............. 715/256
   See application file for complete search history.

(56) References Cited

U.S. PATENT DOCUMENTS

| | | | | |
|---|---|---|---|---|
| 5,799,273 | A * | 8/1998 | Mitchell et al. | 704/235 |
| 6,064,961 | A * | 5/2000 | Hanson | 704/260 |
| 6,236,409 | B1 * | 5/2001 | Hartman | 345/629 |
| 6,760,700 | B2 * | 7/2004 | Lewis et al. | 704/235 |
| 7,499,971 | B1 * | 3/2009 | Chandran | 709/203 |
| 7,900,141 | B2 * | 3/2011 | Kang | 715/253 |
| 2004/0103371 | A1 * | 5/2004 | Chen et al. | 715/513 |
| 2005/0015720 | A1 * | 1/2005 | Yamamoto et al. | 715/513 |
| 2005/0251737 | A1 * | 11/2005 | Kobayashi et al. | 715/513 |
| 2006/0288280 | A1 * | 12/2006 | Makela | 715/530 |
| 2007/0071278 | A1 * | 3/2007 | Cheng | 382/100 |
| 2007/0298385 | A1 * | 12/2007 | Jenkins et al. | 434/156 |
| 2008/0189608 | A1 * | 8/2008 | Nurmi | 715/273 |
| 2008/0204788 | A1 * | 8/2008 | Kelly et al. | 358/1.15 |
| 2008/0270119 | A1 * | 10/2008 | Suzuki | 704/9 |
| 2009/0169061 | A1 * | 7/2009 | Anderson et al. | 382/114 |
| 2009/0197225 | A1 * | 8/2009 | Sheehan et al. | 434/169 |
| 2009/0327277 | A1 * | 12/2009 | Sanborn et al. | 707/5 |
| 2011/0107204 | A1 * | 5/2011 | Cohen et al. | 715/243 |

OTHER PUBLICATIONS

Title: "How to Use the ICEfaces Output Progress Comonent", Date: 2007, URL:<http://facestutorials.icefaces.org/tutorial/outputProgress-tutorial.html>, pp. 1-7.*
David Brett, "Paragraph Scrambler", Date: 2004, URL <http://davidbrett.uniss.it/eLearningTools/paragraph%20scrambler.html>, pp. 1-2.*
"The UVIC Writer's Guide: The Essay Proofreading" The Department of English, University of Victoria, May 13, 1995, pp. 1-2, http://web.uvic.ca/wguide/Pages/ProofPresentProofing.html.
"The Writer's Handbook: How to Proofread" The Writing Center @ The University of Wisconsin— Madison, Feb. 7, 2011, pp. 1-2, http://writing.wisc.edu/Handbook/Proofreading.html.
"Editing and Proofreading" The Writing Center, University of North Carolina At Chapel Hill, pp. 1-5, http://www.unc.edu/depts/wcweb/handouts/proofread.html.

* cited by examiner

*Primary Examiner* — Laurie Ries
*Assistant Examiner* — Mustafa Amin
(74) *Attorney, Agent, or Firm* — Law Office of Jim Boice

(57) ABSTRACT

A text document is parsed and re-ordered according to user-defined rules. The reordered text document is then presented to the user, thus requiring the user to read each section of the text document in a stand-alone manner.

6 Claims, 4 Drawing Sheets

ASSISTANT FOR MANUALLY PROOFREADING TEXT DOCUMENTS

BACKGROUND OF THE INVENTION

The present disclosure relates to the field of computers, and specifically to software. Still more specifically, the present disclosure relates to proofreading text documents.

With the pervasiveness of word processors, the effectiveness of grammar and spell checking tools has clearly advanced over the years. The automation of grammar and spell checking is extremely helpful to users. However, there are many errors that are not detected by automation tools. Hence, it is a useful exercise for writers to critically review the grammar and style of their documents in addition to using grammar and spell checking tools.

Despite the significant advancement of grammar and style checking software, there is still a lack of tools that assist users in manual proofreading within word processors. Thus, there is a need for a solution that assists users with easily proofreading their documents.

BRIEF SUMMARY OF THE INVENTION

A text document is parsed and re-ordered according to user-defined rules. The reordered text document is then presented to the user, thus requiring the user to read each section of the text document in a stand-alone manner.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE INVENTION

Figure 1:
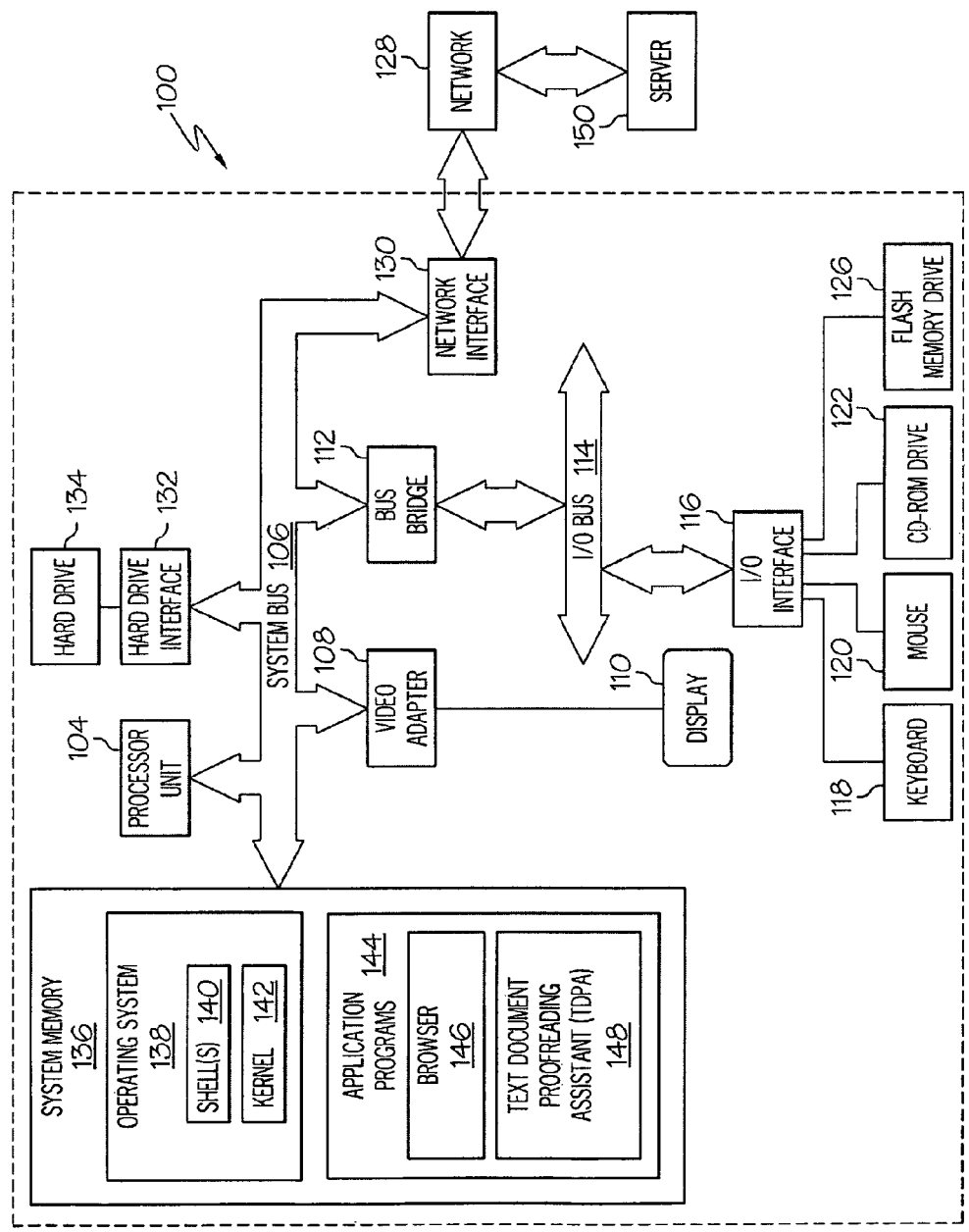
FIG. 1 depicts an exemplary physical computer in which the present invention may be implemented.

As will be appreciated by one skilled in the art, the present invention may be embodied as a method, system, or computer program product. Accordingly, the present invention may take the form of an entirety hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet wireline, optical fiber cable, RF, etc.

Computer program code for carrying out operations of the present invention may be written in an object oriented programming language such as JAVA® (JAVA is a registered trademark of Sun Microsystems, Inc. in the United States and other countries), Smalltalk, C++ or the like. However, the computer program code for carrying out operations of the present invention may also be written, in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interlaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®—UNIX is a registered trademark of The Open Group in the United States and other countries), also called a command processor in Windows® (WINDOWS is a registered trademark of Microsoft Corporation in the United States and other countries), is a program that provides an interpreter and an interface between the user and the operating system, and is generally the highest level of the operating system software hierarchy and serves as a command interpreter. Thus, shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize Hyper Text Transfer Protocol (HTTP) messaging to enable communication with server 150. Application programs 144 in system memory 136 also include a Text Document Proofreading Assistant (TDPA) 148, which executes the steps described below in FIGS. 2-4. In one embodiment computer 100 is able to download TDPA 148 from service provider server 150, preferably in an "on demand" basis.

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention. Note that the hardware architecture for service provider server 150 may be substantially similar to that shown for computer 100.

Figure 2:
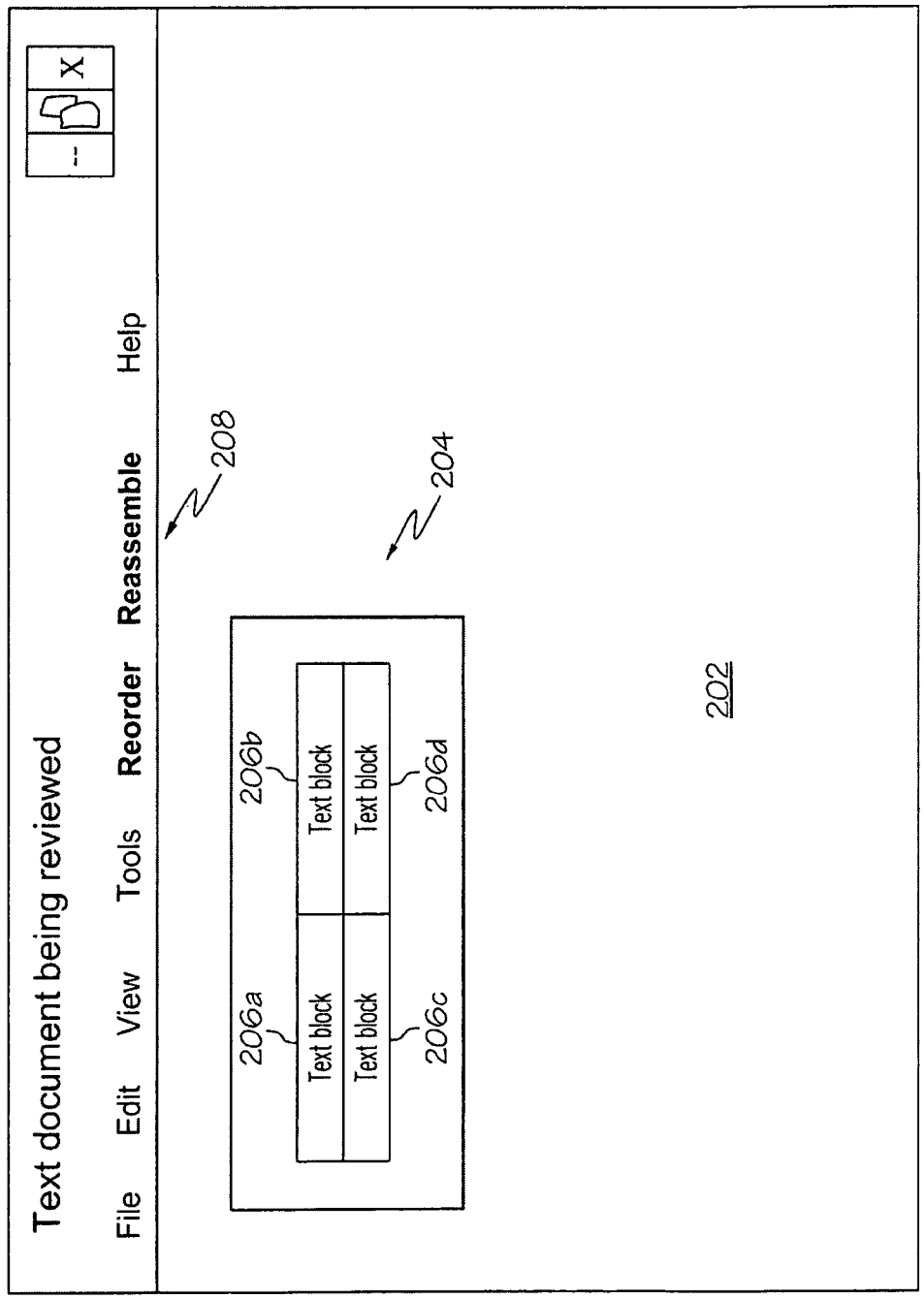
FIG. 2 illustrates an exemplary Graphical User Interface (GUI) on which, an original text document is displayed.

Referring now to FIG. 2, a Graphical User Interface (GUI) 202 is depicted as displaying an original text document 204, which has multiple text blocks 206a-d, where "d" is any integer. That is, while original text document 204 is depicted as having only four text blocks, it is understood that the original, text document 204 may have a large number (e.g., hundreds) of text blocks 206. Note, however, that the text blocks 206a-d are in a specific original order. Note also that a tool bar 208 includes a command (e.g., a drop-down menu, active button, etc.) "Reorder." This command causes the text blocks 206a-d to be parsed out of the original text document 204 and reordered in a seemingly random manner. Note that while the reordering is seemingly random, the reordering may be any order that the user desires. For example, the reordering may in fact be random, as caused by a computer randomly reordering lines, words, etc. Alternatively, however, the reordering can be in any order selected by the user. Thus, words may be re-ordered from first-to-last to last-to-first, alphabetically, by length (number of characters in each word), etc.

Figure 3:
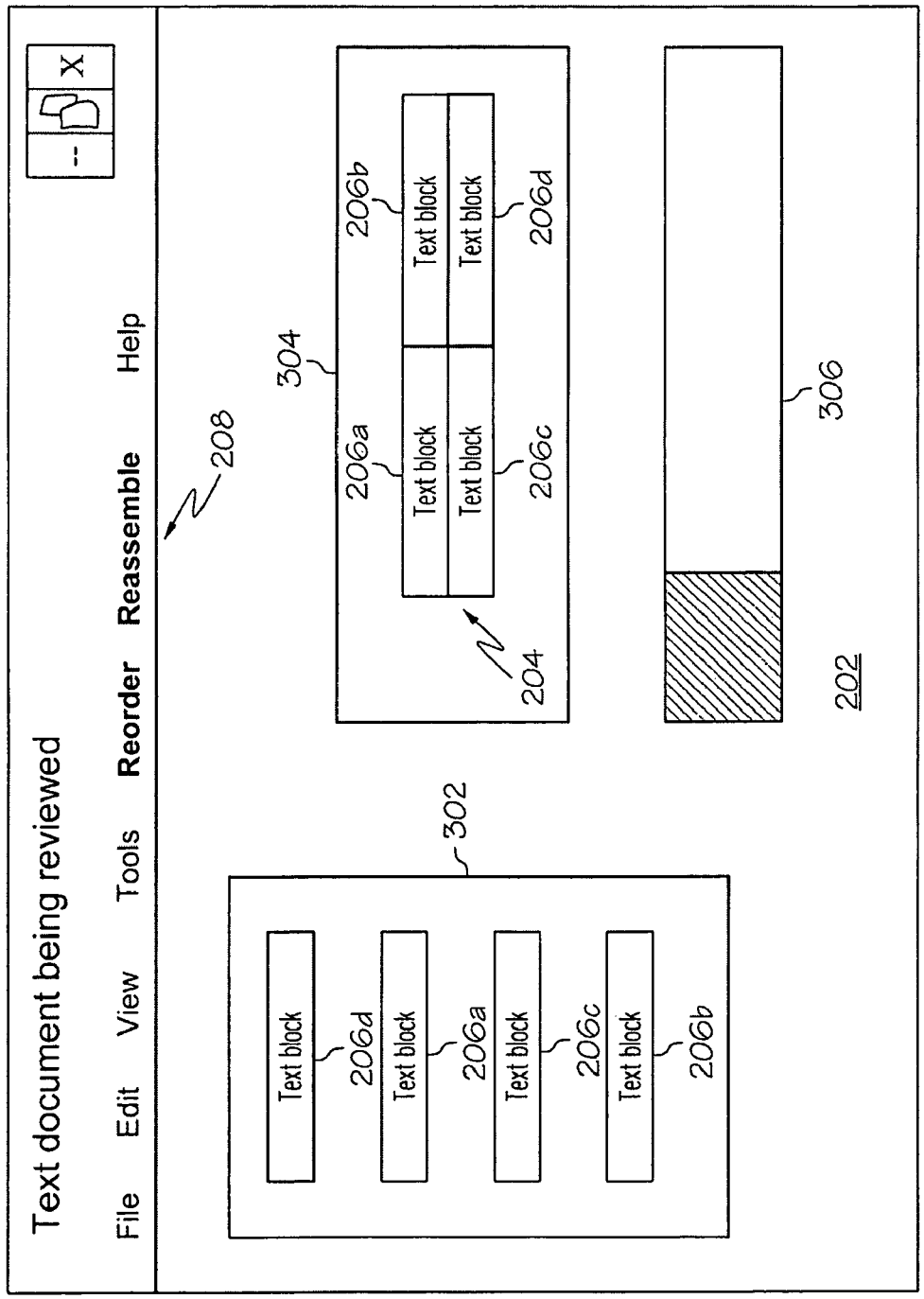
FIG. 3 depicts a reordered version of the original text document shown in FIG. 2 being displayed on the GUI.

After activating the "Reorder" command, the original text document 204 is reconfigured and displayed as a parsed text document 302, as shown in FIG. 3. This parsed text document 302 includes all of the text blocks 206a-d found in the original text, document 204 (shown in FIG. 2), but in a reordered manner. Thus, when reading a particular text block 206, the user is not tempted to skim the document, since each of the text blocks 206a-d will be non-contextual. In order to allow the user to know where a particular text block 206 is found in the original text document 204, a context window 304 in the GUI 202 shows a highlighted text block 206 that corresponds with a current text block mat has been selected by the user for proofreading. In the example shown, the user has selected text block 206d for proofreading. Although text block 206d shows up as a first text block in the parsed text document 302, the context window 304 shows that it is actually the last text block in the original text document 204. In one embodiment, context window 304 presents original text document 204 in a "read only" mode, in order to prevent a user from inadvertently reordering the text blocks 206a-d in the original text document 204.

Note also that a progress bar shows what percentage of the text blocks 206a-d has been proofread (or at least selected for proofreading) by the user. In the example shown, the progress bar shows that 25% of the text blocks have been (or at least are in the process of being) proofread.

By clicking the "Reassemble" command in the tool bar 208, the parsed text document 302 is reassembled in the same order as the original text document 204. That is, a reassembled text document has text blocks 206a-d arranged in the same order as that shown in FIG. 2, but with the user-input corrections (if any) to each of the text blocks 206a-d. The reassembled text document (not shown) is thus displayed on the GUI 202 with the user-input corrections.

Figure 4:
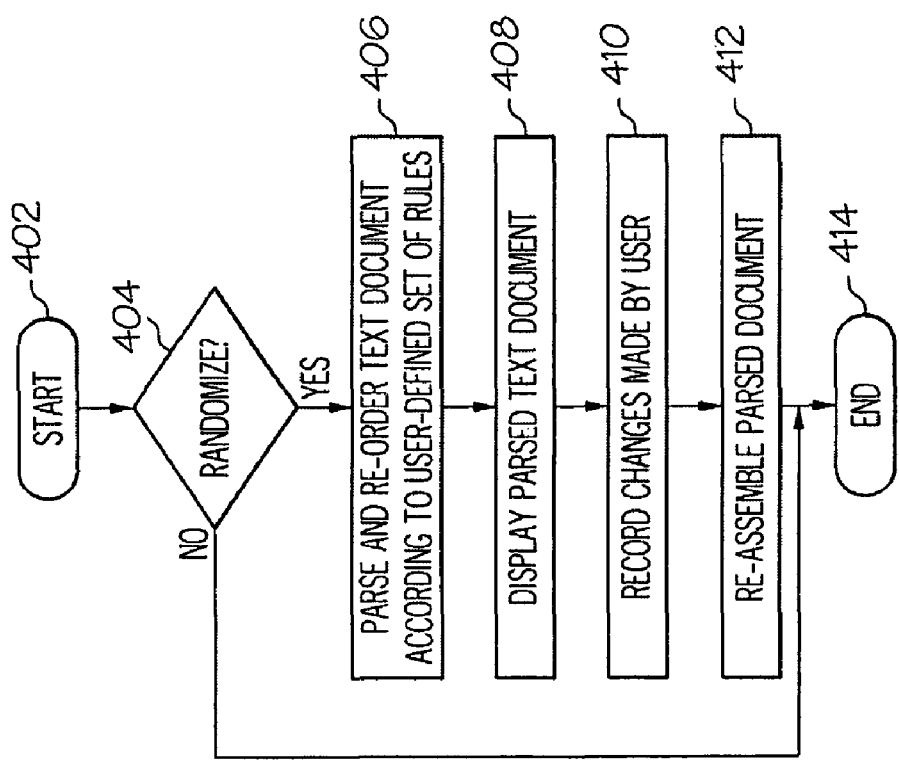
FIG. 4 is a high-level flow-chart of exemplary steps taken by the present invention to parse and reorder a text document for proofreading.

Referring now to FIG. 4, a flow-chart of exemplary steps taken to parse and reorganize a text document for proofreading is presented. After initiator block 402, which may be a text document being selected for proofreading, a decision may be made to parse and reorder (e.g., randomize) text blocks of the text document, as depicted in query block 404. The original, text document is thus parsed into sections, which are re-ordered (i.e., rearranged) according to a user-defined (or pre-defined and user-selected) set of rules (block 406). These rules define 1) what makes up a section and 2) in what order the sections should be rearranged. For example, one of the rules may be that the text sections are defined as whole and single sentences, which may be selected from a particular page or set of pages found in the original text document. Another rule may be to rearrange (reorder) the text blocks (sections) randomly, or from last to first (i.e., the last section in the original text document is presented first in the parsed text document, and vice versa). Alternatively, a first and/or last sentence from each paragraph in the original text document may be selected to be displayed as the parsed text document, thus allowing spot checking, but not complete checking of the original text document for errors.

As depicted in block 408, the parsed text document (having text blocks rearranged according to the user-defined and/or user-selected rules) is then displayed to the user, who is able to make changes on each text block in a sequential manner. These changes are recorded (block 410). After one or more of the blocks have been reviewed, the parsed document is reassembled and displayed to the user (block 412). The process ends at terminator block 414.

Note that while the present invention has been described as having all steps (e.g., displays and corrections) being performed at the GUI, if a user prefers a hard copy of text, then the parsed, reordered text document can be printed out, with an indicator next to each section that allows the user to locate a section in the original text document that needs to be corrected.

Note also that while the present invention has been described as being applied to a text document in a word processing program, the same steps and method described herein are also useful and effective when proofreading lines of computer code, formulas, etc.

As described herein, the present invention provides users with an efficient way to manually proofread documents using the techniques suggested by researchers, such as reading words in a backwards order, reading sentences out of context, etc. Specifically, the tools described herein reduce the time and effort typically exerted to mentally or physically reorder text, and increase the effectiveness of proofreaders. Note mat some users prefer reading documents via a computer monitor while others prefer reading a hard copy. The present invention will accommodate both types of users by printing out re-ordered lines/sentences/words/pages/etc, thus allowing the user to proofread a hard copy of the "jumbled" document.

With a word processing application running and an open document users are able to launch the present invention. For users who prefer to proofread via a monitor, the tools described herein display one sentence or word (determined by user preference) at a time, either in a GUI (as described above), in a pop-up window. That is, the reordered text can be presented with, all components visible at once (as presented and described in the figures above), or each text unit (word, sentence, paragraph, page, chapter, etc.) can be displayed alone on the GUI. A user then evaluates the sentence (or word, etc.) for errors and makes changes as necessary. If all text blocks are not depicted on a single GUI (user's choice), then the user clicks on the "Next" button to see the next sentence or word. For users who prefer a hard copy, the tools described herein reorder the text and create a new printable document.

One advantage to the present invention is that users have assistance when going through the process of proofreading documents themselves. Human error is less likely if each sentence (or word) is evaluated individually. The present invention assists users in this task.

As stated above, users open the tool described herein within a word processor when they would like help proofreading a document. The tool may be in a dialog box that overlays the document. Users would have the option of selecting how they prefer the tool to traverse through the document (e.g. backwards, randomly). The dialog box displays each sentence in an editable format. Users have the option to view the context of the sentence (or word) by clicking a button that shows the user where the sentence was located in the original document. Other options include preferences such as 1) viewing a single sentence or a single word, 2) displaying a progress bar representing the percentage of text blocks that have been displayed compared to the amount of text blocks in the entire document, and 3) manually selecting which pages are to be evaluated. For example, a user could go into a preferences dialog box and decide that he would only like the tool to provide text from page 4-6 in backwards order, with the progress bar present such that the user can see how much of those pages he has reviewed.

In one embodiment of the present invention, text from a document is imported into the tool (e.g., TDPA 148) from the word processor. By using sentence ending punctuation (e.g., periods, question marks) as delimiters and rules about the length and structure, it is possible to intelligently determine what qualifies as a sentence. These sentences can be placed in a data structure (e.g., array, linked list of objects, queue) and the data structure can easily be read backwards or using a random algorithm. If using a random algorithm, the element in the structure is marked to denote that it has been displayed to the user already. The progress bar is calculated by comparing the amount of elements of the structure that has been displayed versus the total number of elements in the structure.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implemented method for aiding in the proofreading of a text document, the computer-implemented method comprising:
    parsing out and reordering text blocks of an original text document to create a parsed text document, wherein the parsed text document is composed of the text blocks, from the original text document, that are rearranged according to a user-defined set of rules;
    displaying the parsed text document in a Graphical User Interface (GUI);
    receiving changes that have been input into the GUI by a user, wherein the changes are to the text blocks in the parsed text document;
    displaying a context window in the GUI, wherein the context window displays a position, within the original text document, of a current text block that is currently selected in the parsed text document for proofreading by the user;
    displaying, in the GUI, a progress bar, wherein the progress bar displays a percentage of the text blocks in the original text document that have been reviewed;
    re-assembling the parsed text document to create a reassembled text document, wherein the reassembled text document includes all of the changes that have been made to the text blocks in the parsed text document by the user, and wherein the reassembled text document displays all of the text blocks in a same order as was found in the original text document; and
    displaying the reassembled text document on the GUI.

2. The computer-implemented method of claim 1, wherein the user-defined set of rules:
    defines each of the text blocks as being a separate sentence from the original text document;
    defines a reordering of the text blocks in the original text document as being from last to first; and
    defines the text blocks as coming from a user-selected set of pages in the original text document.

3. A system comprising:
    a processor;
    a data bus coupled to the processor;
    a memory coupled to the data bus; and
    a computer-usable medium embodying computer program code, the computer program code comprising instructions executable by the processor and configured for aiding in a proofreading of a text document by performing the steps of:
    parsing out and reordering text blocks of an original text document to create a parsed text document, wherein the parsed text document is composed of the text blocks, from the original text document, that are rearranged according to a user-defined set of rules;
    displaying the parsed text document in a Graphical User Interface (GUI);
    receiving changes that have been input into the GUI by a user, wherein the changes are to the text blocks in the parsed text document;
    displaying a context window in the GUI, wherein the context window displays a position, within the original text document, of a current text block that is currently selected in the parsed text document for proofreading by the user;
    displaying, in the GUI, a progress bar, wherein the progress bar displays a percentage of the text blocks in the original text document that have been reviewed;
    re-assembling the parsed text document to create a reassembled text document, wherein the reassembled text document includes all of the changes that have been made to the text blocks in the parsed text document by the user, and wherein the reassembled text document displays all of the text blocks in a same order as was found in the original text document; and
    displaying the reassembled text document on the GUI.

4. The system of claim 3, wherein the user-defined set of rules:
    defines each of the text blocks as being a separate sentence from the original text document;
    defines a reordering of the text blocks in the original text document as being from last to first; and
    defines the text blocks as coming from a user-selected set of pages in the original text document.

5. A computer program product for aiding in the proofreading of a text document, the computer program product comprising:
    a computer-readable storage medium having computer usable program code embodied therewith, the computer usable program code comprising:
    computer usable program code configured for parsing out and reordering text blocks of an original text document to create a parsed text document, wherein the parsed text document is composed of the text blocks, from the original text document, that are rearranged according to a user-defined set of rules;
    computer usable program code configured for displaying the parsed text document in a Graphical User Interface (GUI);
    computer usable program code configured for receiving changes that have been input into the GUI by a user, wherein the changes are to the text blocks in the parsed text document;
    computer usable program code configured for displaying a context window in the GUI, wherein the context window displays a position, within the original text document, of a current text block that is currently selected in the parsed text document for proofreading by the user;

computer usable program code configured for displaying, in the GUI, a progress bar, wherein the progress bar displays a percentage of the text blocks in the original text document that have been reviewed;

computer usable program code configured for re-assembling the parsed text document to create a reassembled text document, wherein the reassembled text document includes all of the changes that have been made to the text blocks in the parsed text document by the user, and wherein the reassembled text document displays all of the text blocks in a same order as was found in the original text document; and computer usable program code configured for displaying the reassembled text document on the GUI.

6. The computer program product of claim 5, wherein the user-defined set of rules:

defines each of the text blocks as being a separate sentence from the original text document;

defines a reordering of the text blocks in the original text document as being from last to first; and defines the text blocks as coming from a user-selected set of pages in the original text document.

\* \* \* \* \*